(12) United States Patent
Dillon

(10) Patent No.: US 6,700,403 B1
(45) Date of Patent: Mar. 2, 2004

(54) DATA DRIVER SYSTEMS WITH PROGRAMMABLE MODES

(75) Inventor: Christopher Daniel Dillon, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/146,992

(22) Filed: May 15, 2002

(51) Int. Cl.[7] .................... H03K 19/0175; H03M 1/36
(52) U.S. Cl. .................... 326/37; 326/30; 326/58; 326/83; 326/90; 327/108; 341/156; 341/159
(58) Field of Search .................... 326/30, 83, 86, 326/90, 56–58; 327/67, 68, 108; 330/253, 258; 341/156, 161–163

(56) References Cited

U.S. PATENT DOCUMENTS

| | | | |
|---|---|---|---|
| 5,977,796 A | 11/1999 | Gabara | |
| 6,005,438 A | 12/1999 | Shing | |
| 6,111,431 A | 8/2000 | Estruda | |
| 6,218,858 B1 | 4/2001 | Menon et al. | |
| 6,556,060 B1 * | 4/2003 | Dillon et al. | 327/210 |
| 6,590,422 B1 * | 7/2003 | Dillon | 326/86 |
| 2003/0042941 A1 * | 3/2003 | Wang et al. | 327/108 |
| 2003/0085737 A1 * | 5/2003 | Tinsley et al. | 326/86 |

* cited by examiner

*Primary Examiner*—Vibol Tan
(74) *Attorney, Agent, or Firm*—Koppel, Jacobs, Patrick & Heybl

(57) ABSTRACT

Data driver systems are provided that have programmable modes of operation to thereby facilitate selection of output signal forms and reduction of output ports in signal conditioning systems (e.g., analog-to-digital converters). The systems effectively reduce pin count by sharing pins between different drivers and selectively configuring the drivers in driver and high output-impedance states.

23 Claims, 3 Drawing Sheets

DATA DRIVER SYSTEMS WITH PROGRAMMABLE MODES

BACKGROUND OF THE INVENTION

1. Field of the Invention

The present invention relates generally to data drivers and, more particularly, to data drivers for signal conditioning systems.

2. Description of the Related Art

Conventional complementary metal-oxide semiconductor (CMOS) logic circuits facilitate single-ended transmission of data. For example, a basic building block of CMOS logic is a CMOS inverter which includes first and second CMOS transistors that are serially-coupled between first and second voltage rails (e.g., between $V_{DD}$ and ground). When the gates of the first and second transistors are successively coupled to the first and second rail voltages, the inverter output successively provides second and first rail voltages as output signals. Among its other advantages, CMOS logic uses substantially less power than many other systems (e.g., transistor-transistor logic (TTL) and emitter-coupled logic (ECL)). In addition, MOS logic circuits can directly drive TTL circuits.

Low voltage differential signaling (LVDS) is a data signaling technology that provides differential current signals for high-rate data transmission. Because noise is generally equally coupled onto differential signal paths, it is substantially rejected by a remote receiver which differentially receives the LVDS signals. Accordingly, LVDS differential transmission is less susceptible to common-mode noise than single-ended transmission systems. Because LVDS drivers generate low-level differential current signals, their power consumption is reduced from conventional single-ended transmission systems and is almost flat regardless of the data rate.

LVDS technology is currently standardized in the ANSI/TIA/EIA-644 Standard of the Telecommunications Industry Association/Electronics Industries Association (TIA/EIA) and in the IEEE 1596.3 Standard of the Institute for Electrical and Electronics Engineering (IEEE).

Because of their different needs, some potential users of signal conditioning circuits (e.g., analog-to-digital converters (ADCs)) prefer output signals that are compatible with CMOS/TTL circuits and others prefer output signals that are compatible with LVDS circuits. In order to enhance their attractiveness to a large number of customers, signal conditioning circuits are, therefore, preferably configured to provide both CMOS and LVDS drive signals.

However, current ADCs often provide a large number of digital bits (e.g., on the order of 16) and are generally fabricated as integrated circuits with limited package dimensions (e.g., on the order of 15 millimeters). Accordingly, it has become increasingly difficult to provide the large number of integrated-circuit pins that are required to provide both CMOS and LVDS drive signals.

BRIEF SUMMARY OF THE INVENTION

The present invention is directed to data driver systems that have programmable modes of operation to thereby facilitate selection of output signal forms and reduction of output ports.

In an exemplary embodiment, rail-to-rail and LVDS drivers share output ports and are combined with a multiplexer that selectively configures them in driver and high output-impedance states.

The novel features of the invention are set forth with particularity in the appended claims. The invention will be best understood from the following description when read in conjunction with the accompanying drawings.

DETAILED DESCRIPTION OF THE INVENTION

Figure 1:
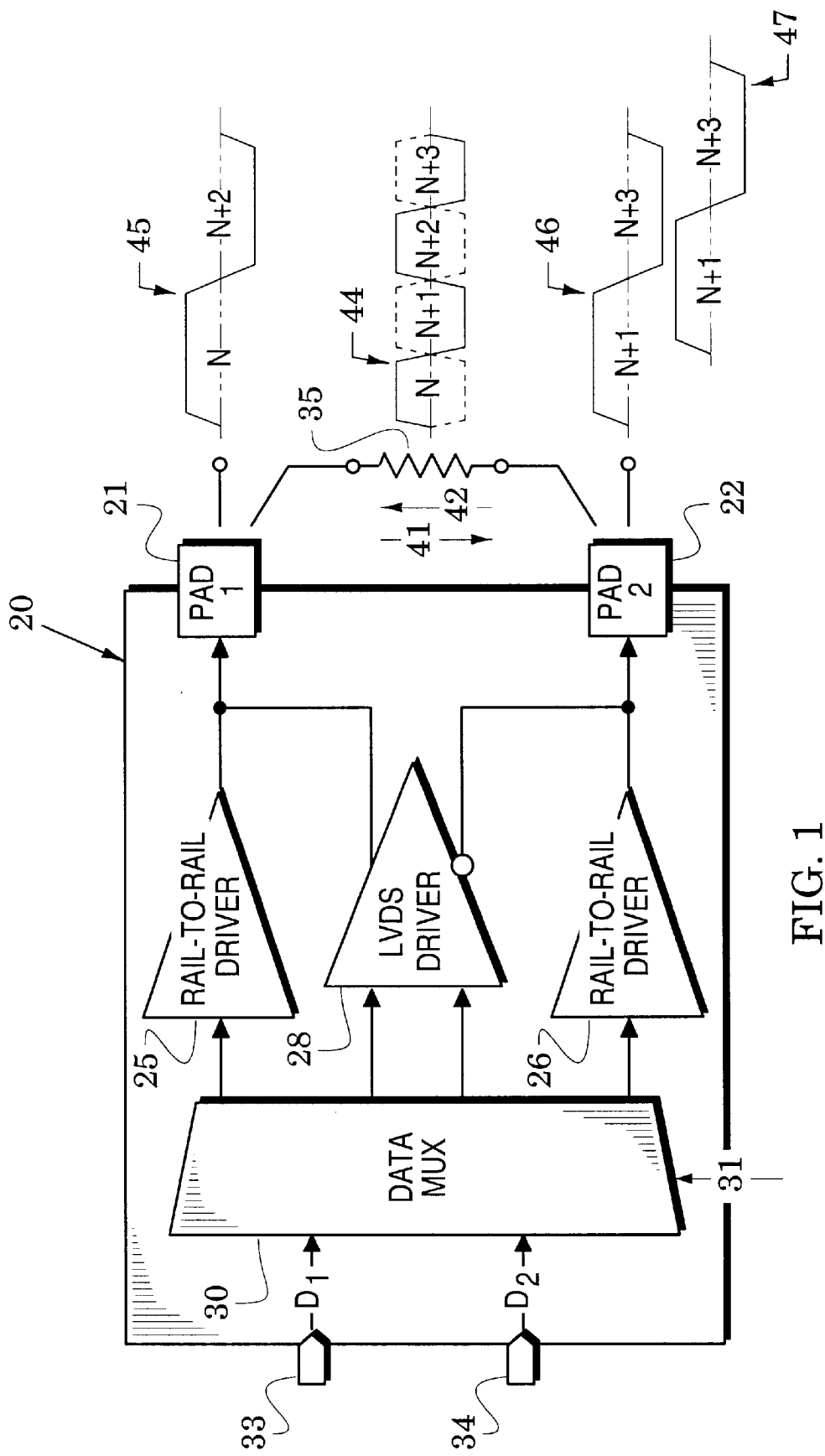
FIG. 1 is a block diagram of a data driver system embodiment of the present invention.
Figure 2:
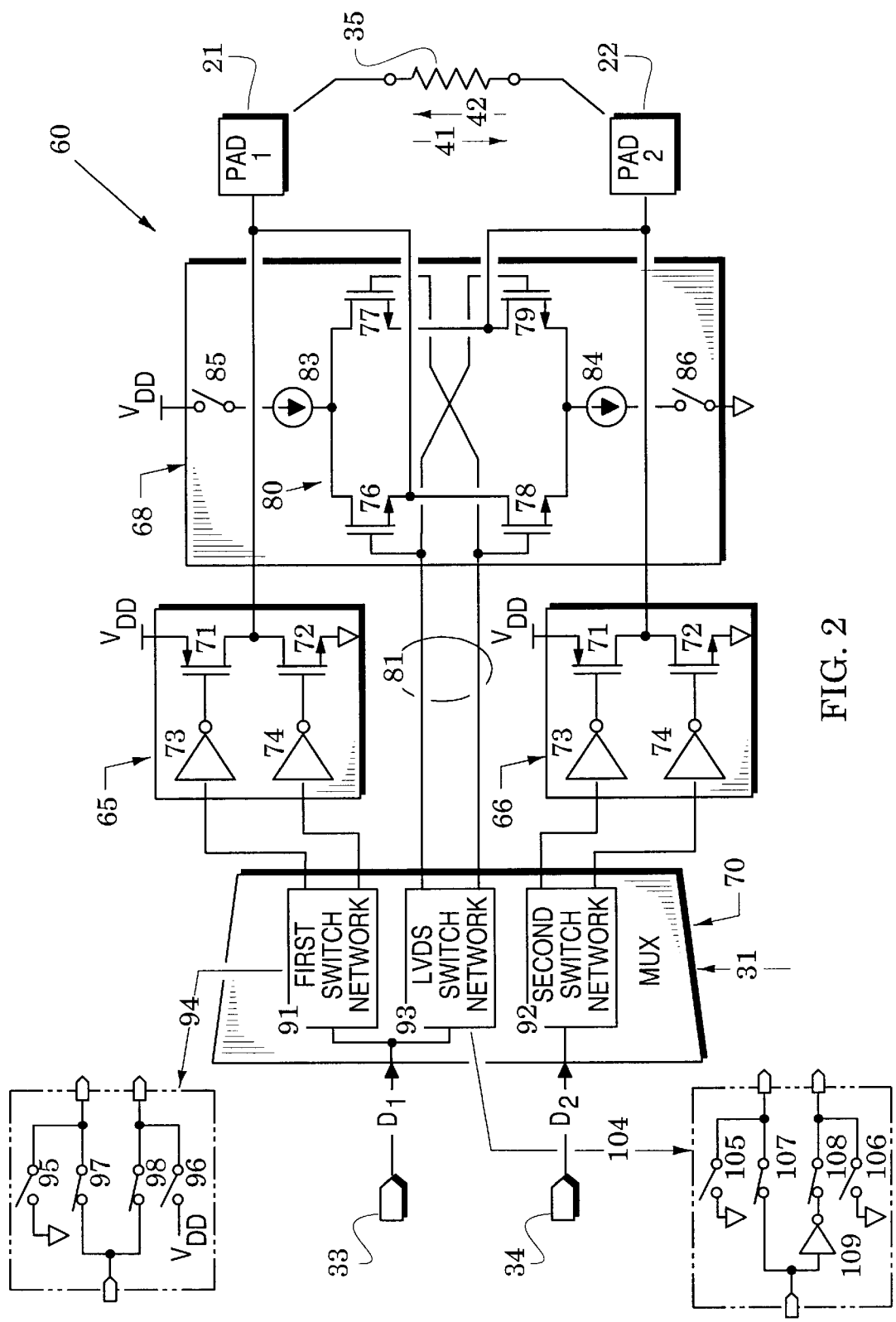
FIG. 2 is a schematic of another data driver system embodiment.
Figure 3:
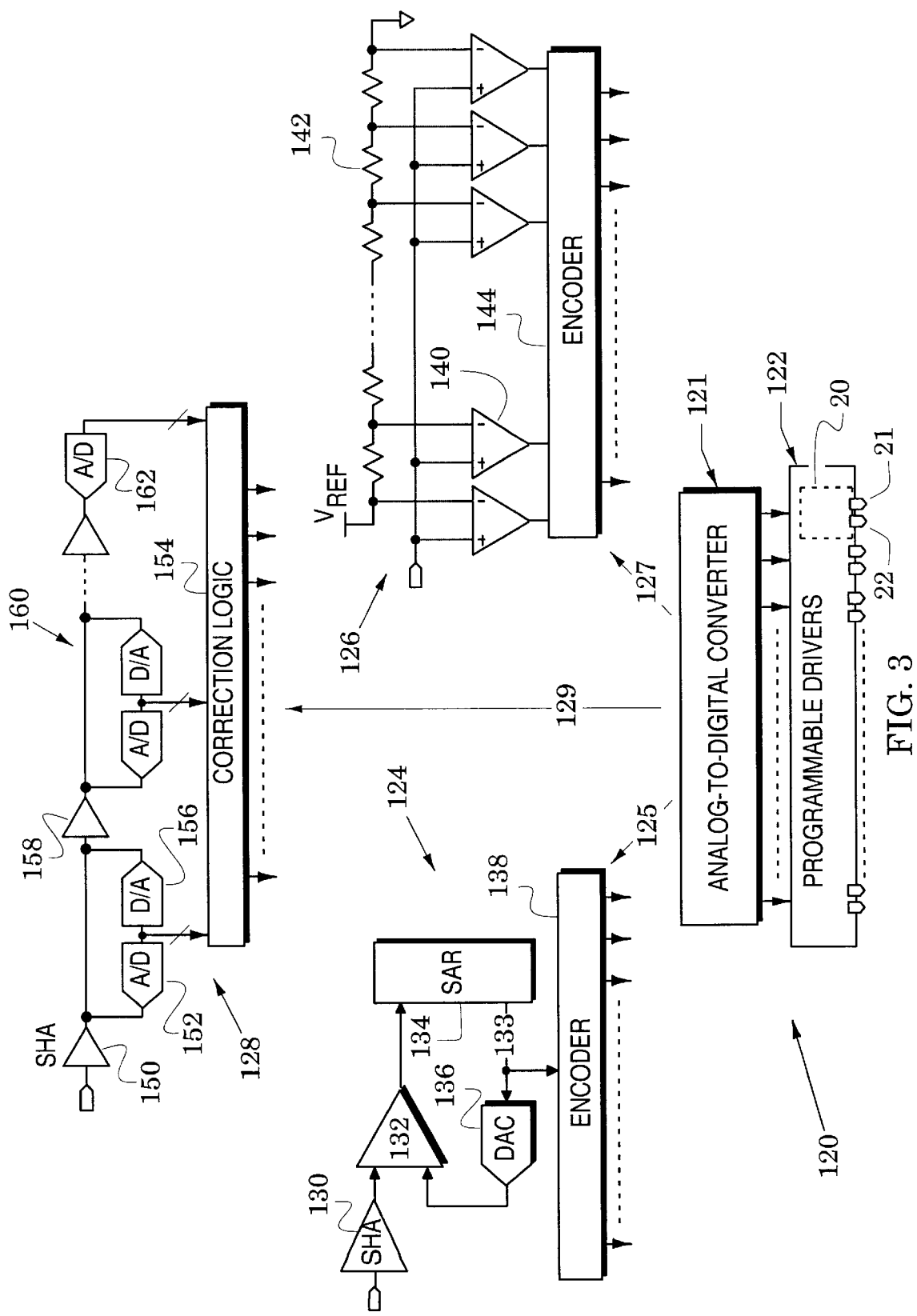
FIG. 3 is a block diagram of ADC systems that are realized with the driver systems of FIGS. 1 and 2.

Data driver system embodiments of the present invention are shown in FIGS. 1 and 2 and ADC system embodiments are shown in FIG. 3. These embodiments effectively reduce pin count for integrated-circuit versions of communication systems (e.g., signal conditioning systems) by sharing pins between different drivers and selectively configuring the drivers in driver and high output-impedance states.

In particular, FIG. 1 illustrates a programmable driver system embodiment 20 that provides data output signals at first and second data output ports (e.g., integrated-circuit pads) 21 and 22. The system includes first and second rail-to-rail drivers 25 and 26, an LVDS driver 28 and a programmable data mulitiplexer 30. The first and second rail-to-rail drivers 25 and 26 are respectively coupled to the first and second data output ports 21 and 22 and the LVDS driver 28 is differentially coupled to the first and second data output ports 21 and 22.

The data multiplexer 30 can be programmed (e.g., in response to a command signal 31) between rail-to-rail and LVDS modes of operation. In the rail-to-rail mode, the multiplexer 30 respectively guides first and second data input signals $D_1$ and $D_2$ from first and second input ports 33 and 34 to the first and second rail-to-rail drivers 25 and 26 and biases the LVDS driver 28 in a high output-impedance state. In the LVDS mode, the multiplexer 30 differentially guides a third data input signal (e.g., the first data input signal $D_1$) to the LVDS driver 28 and biases each of the first and second rail-to-rail drivers 25 and 26 in high output-impedance states.

Essentially, the multiplexer 30 controls tristate modes of the rail-to-rail and LVDS drivers. The programmable driver system 20 is especially suited for use in high-speed integrated-circuit signal conditioning circuits (e.g., ADCs) in which a large number of output digital bits and limited package dimensions make it difficult to provide the large number of integrated-circuit pins that are required to provide more than one output-signal format.

In an exemplary signal conditioning application of the programmable driver system 20, it processes output signals in either its LVDS or rail-to-rail modes to a common set of integrated-circuit output pins. In the LVDS mode, the system would generally drive a resistive load 35 (e.g., a resistor or a properly biased transistor) that is coupled across the first and second output ports 21 and 22. Because of its high-speed capabilities, the LVDS driver 28 can typically operate at the high-speed encoding rates of modern signal conditioning circuits. In response to the first data input signal $D_1$, the LVDS driver 28 would therefore generate differential currents 41 and 42 through the load 35 to realize an output signal in which N, N+1 - - - N+n data signals occur at the system encoding rate as indicated by data signal 44 in FIG. 1.

In contrast, the single-ended rail-to-rail voltage signals of the first and second rail-to-rail drivers 25 and 26 are typically generated across high-impedance loads and generally cannot follow high-speed encoding rates. In response to first and second data input signals $D_1$ and $D_2$, they would therefore typically generate parallel data signals 45 and 46 at the first and second output ports 21 and 22 in which data signals N, N+2 and so on are generated at the first data output port 21 and N+1, N+3 and so on are generated at the second data output port 22.

That is, the rail-to-rail data signals are generated at one half the speed of the LVDS signals but are paralleled to compensate for this speed difference. Alternatively, first and second data input signals $D_1$ and $D_2$ could be altered to generate interleaved data signals 45 and 47 of FIG. 1 wherein the signal 47 is delayed respective to the signal 45. It is apparent therefore, that the programmable driver system 20 can process a respective digital bit in a high-speed integrated-circuit signal conditioning circuit and provide this bit across shared integrated-circuit pins in both rail-to-rail and LVDS operational modes.

FIG. 2 illustrates another programmable driver system embodiment 60 which is coupled between the first and second input ports 33 and 34 and first and second data output ports 21 and 22 of FIG. 1. The system 60 includes first and second rail-to-rail drivers 65 and 66, an LVDS driver 68 and a programmable data mulitiplexer 70 that provides rail-to-rail and LVDS operational modes in response to a command signal 31. The first and second rail-to-rail drivers 65 and 66 are respectively coupled to the first and second data output ports 21 and 22 and the LVDS driver 68 is differentially coupled to the first and second data output ports 21 and 22.

In the driver system 60, the rail-to-rail drivers 65 and 66 are realized as CMOS inverters in which a p-channel MOS transistor 71 and an n-channel MOS transistor 72 are serially-coupled drain-to-drain between bias voltages $V_{DD}$ and ground. The gates of the transistors 71 and 72 are preferably respectively buffered by inverters 73 and 74. In successive response to $V_{DD}$ and ground signals from the multiplexer 70, successive output signals at output ports 21 and 22 will have substantially $V_{DD}$ and ground signal levels (into high-impedance loads). Thus, the CMOS inverters 65 and 66 provide rail-to-rail output signals at the output ports 21 and 22.

The LVDS driver 68 includes first, second, third and fourth current-steering switches in the form of n-channel MOS transistors 76, 77, 78 and 79 that are serially-connected to form a circuit bridge 80 with the first and third transistors 76 and 78 respectively coupled to the top and bottom of a first side of the circuit bridge and the second and fourth transistors 77 and 79 respectively coupled to the top and bottom of a second side of the circuit bridge.

Gates of the first and fourth transistors 76 and 79 are coupled together and gates of the second and third transistors 77 and 78 are coupled together to thereby form a differential input port 81. Current sources 83 and 84 couple (through switches 85 and 86) the top and bottom of the circuit bridge 80 between $V_{DD}$ and ground. The resistive load 35 is coupled (via output ports 21 and 22) across the circuit bridge 80.

In response to one state of differential signals at its input, transistors 76 and 79 will direct current 41 through the load 35 and, in response to a different state of the differential signals, transistors 77 and 78 will direct current 42 through the load. When the circuit bridge 80 is not in operation, current drains can be reduced by opening the switches 85 and 86 (or by applying low signals to the gates of transistors 71 and 72 with the multiplexer 70).

The multiplexer 70 includes a first switch network 91, a second switch network 92 and a third or LVDS switch network 93. As indicated by the realization arrow 94, the first switch network 91 can be realized with switches 95 and 96 that, when closed, respectively couple inverters 73 and 74 to ground and $V_{DD}$. The first switch network 91 also includes switches 97 and 98 that, when closed, couple the data input signal $D_1$ to the inverters 73 and 74.

The first switch network is shown in the rail-to-rail mode wherein the data input signal $D_1$ is processed through the first rail-to-rail driver 65. When programmed to the LVDS mode, the switches 95, 96, 97 and 98 all change state so that the inverter transistors 71 and 72 are biased to high output-impedance states. Although not shown, the second switch network 92 is similarly realized and performs similar operational modes with respect to the output port 22.

As indicated by the realization arrow 104, the third or LVDS switch network 93 can be realized with switches 105 and 106 that, when closed, couple the input port 81 to ground and thereby bias the transistors of the circuit bridge 80 to high output-impedance states. The switch network 93 also includes switches 107 and 108 and an inverter 109 that is in series with the switch 108. When closed, the switches differentially couple the data input signal $D_2$ to the input port 81 of the circuit bridge 80. In a feature of the invention, the inverter 109 converts the single-ended data input signal $D_2$ to a differential input signal. Essentially, the switches 107 and 108 form first and second signal paths and the inverter 109 is positioned in one to these signal paths.

The third or LVDS switch network is shown in the LVDS mode wherein the data input signal $D_2$ is differentially processed through the LVDS driver 68. When programmed to the rail-to-rail mode, the switches 105, 106, 107 and 108 all change state so that the bridge transistors 76, 77, 78 and 79 are biased to high output-impedance states. Although the third or LVDS switch network 93 could be coupled to a respective third input port to receive data input signals, it is exemplarily coupled in the driver embodiment 60 of FIG. 2 to the first input port 33. That is, the first and third data input ports may be separate input ports or may be a common input port.

Driver systems of the present invention are especially suited for use in signal conditioning systems such as the ADC system 120 of FIG. 3 in which a driver system 122 supplies the output signals of an ADC 121. In particular, the driver system provides pairs of output pins such as the exemplary pair of pins 21 and 22 (also shown in FIGS. 1 and 2) and couples a driver system 123 to the pair wherein the driver system 123 is exemplarized by the systems 20 and 60 of FIGS. 1 and 2.

The ADC 121 can be realized as various specific ADC structures which include a successive approximation ADC 124, a flash ADC 126 and a pipelined ADC 128 as respectively indicated in FIG. 3 by realization arrows 125, 127 and 129.

In the successive approximation ADC 124, an analog input signal is sampled with a sample-and-hold amplifier (SHA) 130 and the resulting samples passed to one input of a comparator 132. In response to digital command signals 133 from a successive-approximation register (SAR) 134, a DAC 136 provides analog approximation signals to another input of the comparator 132.

With feedback decisions from the comparator 132, the SAR typically determines the most significant bit (MSB)

initially and then proceeds to vary its digital command signals 133 to successively determine the remaining bits. At the end of this successive process, the final digital command signals 133 are processed to the converted digital signal by an encoder 138 and passed to the programmable drivers 122.

In the flash ADC 126, an analog input signal is applied to a string of comparators 140 which each receive a respective reference signal from a ladder of serially-connected resistors 142. The decisions of the comparators 140 is coupled to an encoder 144 that provides the converted digital signal to the programmable drivers 122.

The pipelined ADC 128 samples analog signals with a SHA 150 and converts the sampled signals to MSBs with an ADC 152 (e.g., a flash ADC). These MSBs are coupled to a correction logic 154 and are also converted to a corresponding analog signal in a DAC 156. The corresponding analog signal is subtracted from the sampled signals to produce an analog residue signal that is gained up in an amplifier 158 and passed to a succeeding conversion stage 160. At the end of this process, a final ADC 162 generates the least significant bits and passes them to the correction logic 154 which time aligns the converted signals of all stages to thereby generate the output digital signal. The residue signals between conversion stages are typically sampled before processing by succeeding stages. The outputs of the correction logic 154 are coupled to the programmable drivers 122.

The switches of the switch networks 91, 92 and 93 of FIG. 2 can be realized in various conventional forms, e.g., as a parallel an n-channel MOS transistor and a n-channel MOS transistor coupled in parallel with their common sources and their common drains forming opposite switch terminals that are coupled and decoupled in response to command signals applied to their gates.

Although data bits in signal conditioning systems are typically designated as $D_0, D_1 \text{---} D_n$, exemplary data bits at first and second input ports have been shown as $D_1$ and $D_2$ in FIGS. 1 and 2 to enhance clarity and simplicity of the corresponding description.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A programmable driver system that respectively provides first and second output signals at first and second output ports in a rail-to-rail mode and provides low voltage differential signaling (LVDS) output signals at said first and second output ports in an LVDS mode, the system comprising:

first and second inverters respectively coupled to said first and second output ports;

a low voltage differential signaling (LVDS) driver differentially coupled to said first and second output ports; and a programmable data multiplexer that respectively guides first and second input signals to said first and second inverters and biases said LVDS driver to a high output-impedance state in a rail-to-rail mode and that guides a third input signal to said LVDS driver and biases said first and second inverters to a high output-impedance state in an LVDS mode.

2. The system of claim 1, wherein said first and second inverters are first and second complementary metal-oxide semiconductor (CMOS) inverters.

3. The system of claim 1, wherein:

said LVDS driver includes first, second, third and fourth current-steering switches that are serially-connected to form a circuit bridge with said first and third switches respectively coupled to the top and bottom of a first side of said circuit bridge and said second and fourth switches respectively coupled to the top and bottom of a second side of said circuit bridge; and said first and second output ports are coupled across said circuit bridge.

4. The system of claim 3, wherein said LVDS driver further includes first and second current sources that are respectively coupled to the top and bottom of said circuit bridge.

5. The system of claim 1, wherein said multiplexer includes:

a first switch network that couples said first inverter to a first input port to receive said first input signal in said rail-to-rail mode and biases said first inverter to a high output-impedance state in said LVDS mode;

a second switch network that couples said second inverter to a second input port to receive said second input signal in said rail-to-rail mode and biases said second inverter to a high output-impedance state in said LVDS mode; and an LVDS switch network-that differentially couples said LVDS driver to a said third input port to receive said differential input signal in said LVDS mode and biases said LVDS driver to a high output-impedance state in said rail-to-rail mode.

6. The system of claim 5, wherein said LVDS switch network includes:

first and second switch paths between said third input port and said LVDS driver; and an inverter in said second switch path;

said LVDS driver thereby differentially coupled to said third input port.

7. The system of claim 5, wherein said first input port and said third input port are a common input port.

8. A programmable driver system that provides data output signals at first and second data output ports, the system comprising:

first and second rail-to-rail drivers that are respectively coupled to said first and second data output ports;

a low voltage differential signaling (LVDS) driver that is differentially coupled to said first and second data output ports; and a programmable data multiplexer that, in a rail-to-rail mode, respectively guides first and second data input signals to said first and second rail-to-rail drivers and biases said LVDS driver in a high output-impedance state and that, in an LVDS mode, differentially guides a third data input signal to said LVDS driver and biases said first and second rail-to-rail drivers in a high output-impedance state.

9. The system of claim 8, wherein said first and second rail-to-rail drivers each include serially-connected first and second transistors.

10. The system of claim 9, wherein:

said first transistor is a p-channel metal-oxide semiconductor (MOS) transistor and said second transistor is an n-channel MOS transistor; and said data multiplexer couples high and low rail signals respectively to said p-channel and n-channel MOS transistors to bias them in said high output-impedance state.

11. The system of claim 8 wherein:

said LVDS driver includes first, a second, third and fourth current-steering switches that are serially-connected to form a circuit bridge with said first and third switches respectively coupled to the top and bottom of a first side of said circuit bridge and said second and fourth switches respectively coupled to the top and bottom of a second side of said circuit bridge; and said first and second data output port are coupled across said circuit bridge.

12. The system of claim 8 wherein said multiplexer includes:

a first switch network that couples said first rail-to-rail driver to a first data input port to receive said first data in put signal in said rail-to-rail mode and biases said first rail-to-rail driver to a high output-impedance state in said LVDS mode;

a second switch network that couples said second rail-to-rail driver to a second data input port to receive said second data input signal in said rail-to-rail mode and biases said second rail-to-rail driver to a high output-impedance state in said LVDS mode; and an LVDS switch network that differentially couples said LVDS driver to an LVDS data input port to receive said third data input signal in said LVDS mode and biases said LVDS driver to a high output-impedance state in said rail-to-rail mode.

13. The system of claim 11, wherein said LVDS switch network includes:

first and second switch paths between said third data input port and said LVDS driver; and an inverter in said second switch path;

said LVDS driver thereby differentially coupled to said LVDS data input port.

14. The system of claim 11, wherein said first data input port and said third data input port are a common data input port.

15. An analog-to-digital converter (ADC) system that provides selectable rail-to-rail output signals and LVDS output signals at ADC output ports, the system comprising:

an ADC that converts analog input signals into digital output signals; and a programmable driver system that includes:

a) pairs of rail-to-rail drivers wherein each of said drivers is coupled to a respective one of said ADC output ports;

b) low voltage differential signaling (LVDS) drivers that are each differentially coupled to a respective pair of said ADC output ports; and c) a programmable multiplexer that, in a rail-to-rail mode, respectively guides each of said digital output signals to a respective one of said first and second rail-to-rail drivers and biases each of said LVDS drivers in a high output-impedance state and that, in an LVDS mode, differentially guides each of said digital output signals to a respective one of said LVDS drivers and biases each of said rail-to-rail drivers in a high output-impedance state.

16. The system of claim 15, wherein said ADC is a successive approximation ADC.

17. The system of claim 15, wherein said ADC is a flash ADC.

18. The system of claim 15, wherein said ADC is a pipelined ADC.

19. The system of claim 15, wherein said rail-to-rail drivers each include serially-connected first and second transistors.

20. The system of claim 19, wherein:

said first transistor is a p-channel metal-oxide semiconductor (MOS) transistor and said second transistor is an n-channel MOS transistor; and said multiplexer couples high and low rail signals respectively to said p-channel and n-channel MOS transistors to bias them in said high output-impedance state.

21. The system of claim 15, wherein:

each of said LVDS drivers includes first, second, third and fourth current-steering switches that are serially-connected to form a circuit bridge with said first and third switches respectively coupled to the top and bottom of a first side of said circuit bridge and said second and fourth switches respectively coupled to the top and bottom of a second side of said circuit bridge; and said first and second sides of said circuit bridge are coupled across said respective pair of ADC output ports.

22. The system of claim 15, wherein said multiplexer includes:

rail-to-rail switch networks that each guides a respective one of said digital output signals to a respective one of said rail-to-rail drivers in said rail-to-rail mode and biases each of said rail-to-rail drivers to a high output-impedance state in said LVDS mode; and LVDS switch networks that each differentially couples a respective one of said digital output signals to a respective one of said LVDS drivers in said LVDS mode and biases each of said LVDS drivers to a high output-impedance state in said rail-to-rail mode.

23. The system of claim 22, wherein each of said LVDS switch networks includes:

first and second switch paths that are coupled to the respective LVDS driver; and an inverter in said second switch path;

the respective digital output signal thereby differentially coupled to the respective LVDS driver.

\* \* \* \* \*